United States Patent [19]

Nomoto et al.

[11] 3,760,196

[45] Sept. 18, 1973

[54] NOISE SUPPRESSION CIRCUIT

[75] Inventors: Yoshihisa Nomoto; Masanori Oguino, both of Totsuka-ku, Yokohama; Seiichi Ueda, Kodaira; Sadao Kitamura, Kamakura, all of Japan

[73] Assignee: Hitachi, Ltd., Tokyo, Japan

[22] Filed: Apr. 25, 1972

[21] Appl. No.: 247,347

[30] Foreign Application Priority Data

Apr. 30, 1971 Japan ............................46/27963

[52] U.S. Cl................... 307/237, 328/139, 328/171

[51] Int. Cl. ............................................ H03k 5/08

[58] Field of Search.................... 307/237; 328/139, 328/151, 171

[56] References Cited

UNITED STATES PATENTS

| | | | |
|---|---|---|---|
| 3,290,441 | 12/1966 | Humphrey | 307/237 X |
| 3,555,299 | 1/1971 | Millward | 307/237 X |
| 3,654,437 | 2/1971 | Nakashima | 307/237 X |

*Primary Examiner*—John Zazworsky
*Attorney*—Paul M. Craig, Jr. et al.

[57] ABSTRACT

A noise suppression circuit comprising a transistor, a resistor, a first and a second diode, a first and a second constant current circuit and a capacitor in which the resistor and the first diode are connected in series between the collector and the emitter of the transistor, the first constant current circuit is connected between the emitter of the transistor and ground, the second diode and the second constant current circuit are connected in series between the connecting point of the resistor and the first diode and ground, a capacitor is connected between the connecting point of the second diode and the second constant current circuit and ground, and, an input signal is supplied to the base of the transistor and an output signal in which noise is supressed appears at the connecting point of the resistor and the first diode.

8 Claims, 5 Drawing Figures

NOISE SUPPRESSION CIRCUIT

This invention relates to a noise suppression circuit for suppressing noises contained in a signal. The present invention is particularly suitable for application to an integrated noise suppression circuit used in television receivers for suppressing any noises contained in a composite video signal applied to the synchronizing separator circuit and automatic gain control (AGC) circuit.

A known noise suppression circuit used heretofore in television receivers comprises a diode and a constant voltage source connected in series between the emitter of a first video amplifying transistor and ground. In such known noise suppression circuit, the voltage of the constant voltage source is selected to be larger than the peak value of the synchronizing signal component in a composite video signal appearing at the emitter of the transistor so as to suppress noises whose levels are higher than the voltage level of the constant voltage source when such noises are contained in the composite video signal.

However, the known noise suppression circuit of the kind above described has been defective in that variations in the field strength around the antenna result in an unstable operation of the noise supression circuit due to the fact that a constant reference voltage is employed for the detection of noises to be suppressed. More precisely, when the field strength around the antenna is higher than a certain predetermined level, the peak value of the synchronizing signal component in the composite video signal appearing at the emitter of the first video amplifying transistor is larger than the reference voltage and the synchronizing signal is suppressed in addition to the noises with the result that the synchronizing signal appearing at the output of the synchronizing separator circuit may include the video signal. On the other hand, when the field strength around the antenna is lower than the predetermined level, noises may appear at the output of the synchronizing separator circuit and AGC circuit thereby disturbing the normal operation of these circuits.

Further, the known noise suppression circuit, which does not include any temperature compensation therein, is defective in that the operating characteristic of the first video amplifying transistor is variable depending on the ambient temperature and this leads to variations in the noise suppression level with the result that noises may appear at the output of the synchronizing separator circuit and AGC circuit.

It is therefore an object of the present invention to provide a novel and useful noise suppression circuit for use in television receivers.

Another object of the present invention is to provide a noise suppression circuit in which means are provided to prevent undesirable variations in the noise suppression level even with variations in the input signal level. A further object of the present invention is to provide a noise suppression circuit in which means are provided to prevent undesirable variations in the noise suppression level even with variations in the ambient temperature.

According to the invention, there is provided a noise suppression circuit comprising:

a transistor, the collector thereof being connected to a power supply;

a diode and an impedance means capable of passing direct current connected in series between the emitter and the collector of said transistor;

a constant current circuit connected between the emitter of said transistor and ground for maintaining constant the sum of the emitter current of said transistor and the current flowing through said diode;

a DC restorer connected between the connecting point of said impedance means and said diode and ground;

means for supplying an input signal to the base of said transistor; and means for generating an output signal across said impedance means.

In the present invention, the DC restorer above described comprises, for example, a second diode and a second constant current circuit connected in series between the connecting point of the impedance means and the diode and ground, and a capacitor connected in parallel with the second constant current circuit. These two constant current circuits in the noise suppression circuit according to the present invention are, for example, transistor circuits each including a transistor to the base of which a constant bias voltage is continuously applied.

The present invention further provides a combined noise suppression and cancelling circuit in which the noise suppression circuit above described is combined with a noise cancelling circuit which includes a pair of a first and a second transistor. The noise cancelling circuit has such an arrangement that the input signal applied to the noise suppression circuit is applied to the base of the first transistor in the transistor pair and a DC voltage whose value is proportional to the peak value of the input signal is applied to the base of the second transistor so that a pulse appears at the collector of one of the first and second transistors when noise whose amplitude is greater than a predetermined value is contained in the input signal. The combination of the noise cancelling circuit with the noise suppression circuit is effective in suppressing noises whose amplitudes lie in the range between the peak value of the input signal and the predetermined value above described, thereby cancelling any noises having an amplitude greater than the predetermined value.

The combined noise suppression and cancelling circuit according to the present invention may further include means for preventing an undesirable reduction in the base voltage of the second transistor in the transistor pair in the noise cancelling circuit due to a series of continuous noises.

The above and other objects, features and advantages of the present invention will be apparent from the following detailed description of the present invention taken in conjunction with the accompanying drawings, in which:

FIG. 1 is a circuit diagram showing the basic structure of a noise suppression circuit according to the present invention;

FIG. 2,*a* and *b* show signal waveforms appearing at the input and output of the circuit shown in FIG. 1;

Figure 1:
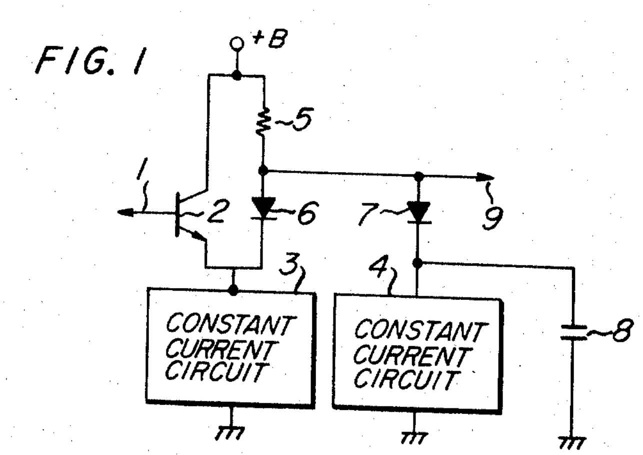
Figure 2:
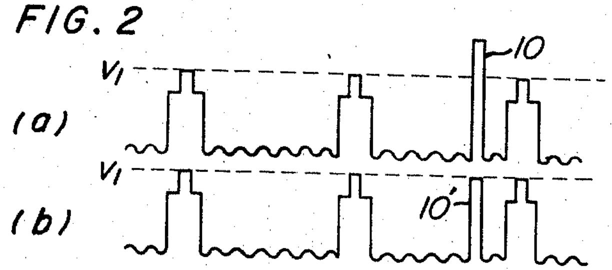

Referring to FIG. 1 showing the basic structure of a noise suppression circuit according to the present invention, the noise suppression circuit comprises an input terminal 1, an impedance converting transistor 2, constant current circuits 3 and 4, a resistor 5, diodes 6 and 7, a capacitor 8, and an output terminal 9. FIGS. 2*a* and 2b show signal waveforms appearing at the input terminal 1 and the output terminal 9 respectively when the noise suppression circuit shown in FIG. 1 is applied to a television receiver. When a composite video signal including a synchronizing signal as shown in FIG. 2*a* is applied to the input terminal 1 of the noise suppression circuit shown in FIG. 1, this composite video signal is amplified and appears at the output terminal 9 with a waveform as shown in FIG. 2b in which it will be seen that a noise in the form of a pulse is sufficiently suppressed. The current values of the constant current circuits 3 and 4 and the resistance value of the resistor 5 are so selected that the diode 6 is kept in the conducting state when the composite video signal applied to the input terminal 1 does not contain any noise therein.

When the diode 6 is continuously conducting, the voltage appearing at the output terminal 9 is represented by a value which is obtained by subtracting the baseemitter voltage of the transistor 2 from the voltage applied to the input terminal 1 and adding the anode-cathode voltage of the diode 6 to the resultant voltage. The voltage appearing at the output terminal 9 is approximately equal to the input voltage since the base-emitter voltage of the transistor 2 is approximately equal to the anode-cathode voltage of the diode 6. In this circuit, the diode 6 acts to compensate the base-emitter voltage of the transistor 2. Therefore, the output level does not vary and remains stable irrespective of any variations in the ambient temperature. The diode 7 conducts at the peak level of the synchronizing signal component in the composite video signal shown in FIG. 2*b* and charges the capacitor 8.

Suppose now that a noise pulse 10 whose level is higher than the peak value $V_1$ of the synchronizing signal as shown in FIG. 2a is applied to the input terminal 1. While the voltage across the capacitor 8 is increased with the charging time constant which is determined by the resistance value of the resistor 5 and the capacitance value of the capacitor 8, such voltage is maintained substantially constant, that is, such voltage is maintained substantially at the peak value of the synchronizing signal due to the fact that the charging time constant is sufficiently large against the high-frequency noise pulse 10. In the meantime, the diode 6 is cut off since the cathode voltage thereof increases in proportion to the input. Thus, the noise pulse 10 of the level higher than the peak value of the synchronizing signal is not transmitted to the output terminal 9 due to the fact that the diode 6 is non-conducting, and such noise pulse 10 is suppressed to the level of the peak value of the synchronizing signal as shown by 10' in FIG. 2*b*. Any variation in the peak value of the synchronizing signal component in the composite video signal applied to the input terminal 1 results merely in a corresponding variation in the voltage across the capacitor 8, and the function of the circuit suppressing a noise pulse whose level is higher than the peak value of the synchronizing signal is not lost in any way. It will be understood from the above description that noise whose amplitude is greater than the peak value of the synchronizing signal in a composite video signal applied to the input terminal 1 can be reliably suppressed even when, for example, a variation occurs in the field strength around the antenna and the peak value of the synchronizing signal is thereby varied, and that it is possible to derive from the output terminal 9 an impedance- converted signal of the same voltage level as the composite video signal applied to the input terminal 1.

Figure 3:
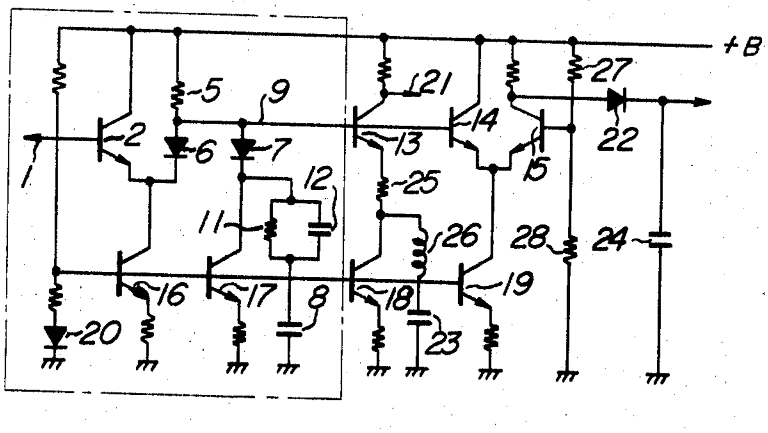
FIG. 3 is a circuit diagram of an embodiment of the present invention.

FIG. 3 is a circuit diagram of an embodiment of the present invention, and like reference numerals are used to denote like parts appearing in FIG. 1. In FIG. 3, the noise suppression circuit according to the present invention corresponds to the portion surrounded by the chain line and comprises an input terminal 1, an impedance converting transistor 2, resistors 5 and 11, capacitors 8 and 12, constant current circuits including respective transistors 16 and 17, a temperature compensating diode 20 and an output terminal 9. A composite video signal including a synchronizing signal as shown in FIG. 2*a* is applied to the input terminal 1. This composite video signal is subject to impedance conversion by the transistor 2 and is then subject to a level shift by the diode 6 to appear at the output terminal 9 as a signal at the same level as the composite video signal applied to the input terminal 1 as shown in FIG. 2*b*. The composite video signal appearing at the terminal 9 is subject to peak detection by the peak detecting diode 7 which supplies a voltage proportional to the peak value of the synchronizing signal to the capacitors 12 and 8. The charges stored in the capacitors 8 and 12 are discharged through the transistor 17 so that a DC voltage corresponding to the peak value of the synchronizing signal can be restored.

The composite video signal appearing at the terminal 9 is applied to a synchronizing signal separating transistor 13 in a synchronizing separator circuit so that the synchronizing signal is separated from the composite video signal and appears in a negative polarity at a terminal 21. The composite video signal appearing at the terminal 9 is applied further to a transistor pre-amplifier 14 in a pair of transistor pre-amplifiers 14 and 15 in an AGC circuit and the synchronizing signal portion whose level is higher than the base voltage of the transistor 15 is amplified by the transistors 14 and 15. This signal is subject to peak detection by a peak detecting diode 22 and is then applied to an intermediate frequency amplifier (not shown) and to a high-frequency amplifier (not shown) thereby controlling the gain of the intermediate frequency amplifier and high-frequency amplifier so that the peak value of the input signal applied to the terminal 1 is equal to the base voltage level of the transistor 15. When a noise pulse 10 whose level is higher than the peak value $V_1$ of the synchronizing signal as shown in FIG. 2*a* is applied to the input terminal 1, the voltage appearing at the terminal 9 increases gradually with the time constant which is determined by the resistance value of the resistor 5 and the capacitance values of the capacitors 8 and 12. Thus, this voltage can be considered substantially constant against the high-frequency noise pulse 10. In the meantime, the diode 6 is cut off since the cathode voltage thereof increases in proportion to the input, thereby preventing undesirable transmission of the noise pulse to the terminal 9. Therefore, any undue voltage due to the noise is not applied across a capacitor 23 in the synchronizing separator circuit and the separation of the synchronizing signal can be reliably carried out. Similarly, any undue voltage due to the noise is not applied across a peak detecting capacitor 24 in the AGC circuit and the automatic gain control can be reliably carried out.

The resistor 11 and the capacitor 12 constitute a high-pass filter which has a sufficiently high impedance against a low-frequency signal. This high-pass filter is provided so that, even when the input signal applied to the terminal 1 varies in a low frequency range, the voltage appearing at the terminal 9 can satisfactorily follow up such a variation without being affected by the capacitor 8. Thus, even in the case in which the field strength around the antenna is subject to amplitude modulation by a body such as an airplane and a variation of the order of 100 Hz occurs in the input signal, such input signal can be transmitted to the AGC circuit without being suppressed thereby controlling the gain of the amplifiers in the AGC circuit and reducing the variation in the input signal. A resistor 25 and a coil 26 constitute a low-pass filter in the synchronizing separator circuit. This low-pass filter acts to remove any high-frequency noises whose levels are lower than the peak level of the synchronizing signals as well as high-frequency components of the video signal thereby preventing undesirable appearance of the high-frequency noises and video signal at the terminal 21. Further, by virtue of the mutual compensation between the base-emitter voltage of the transistor 2 and the anode-cathode voltage of the diode 6 and between the base-emitter voltage of the transistor 14 and that of the transistor 15, the AGC circuit functions in such a manner that the peak level of the signal applied to the terminal 1 is substantially equal to the base voltage of the transistor 15. It is especially preferable that these circuit elements are integrated in the form of an integrated circuit in that the desired resistance ratio can be obtained with good precision and the transistors 2, 13, 14 and 15 can be constructed to have substantially the same base-emitter voltage. The integrated structure is advantageous in that the peak level of the signal applied to the terminal 1 can be remarkably precisely controlled. Further, the circuit can quite stably operate against any variations in the ambient temperature due to the fact that the ratio of the resistance of a resistor 27 to that of a resistor 28 is the principal factor for determining the peak level of the input signal applied to the terminal 1. Constant current circuits including respective transistors 18 and 19 are provided, and the collector of the transistor 18 is connected to the emitter of the transistor 13 through the resistor 25, while the collector of the transistor 19 is connected to the common-connected emitters of the transistors 14 and 15.

Figure 4:
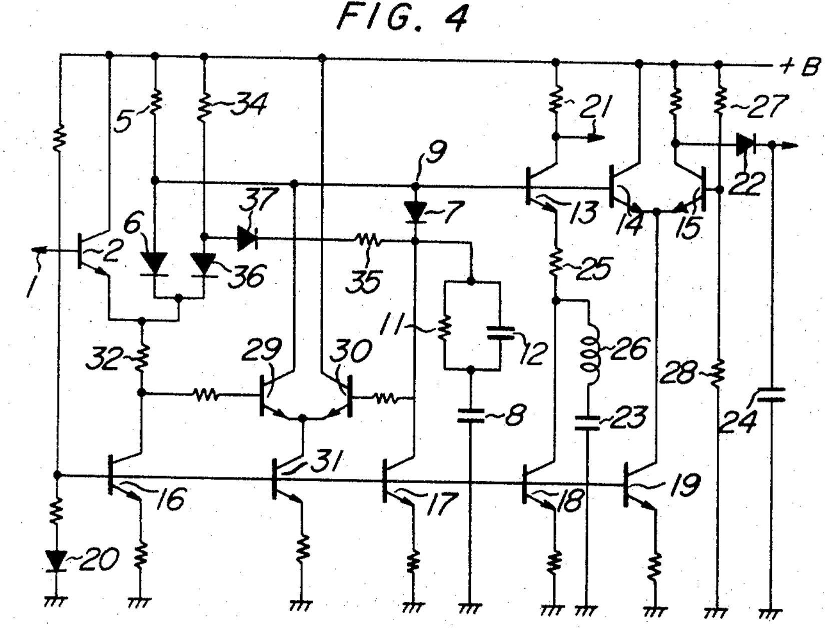
FIG. 4 is a circuit diagram of another embodiment of the present invention, showing the structure of a combined noise suppression and cancelling circuit.

FIG. 4 shows another embodiment of the present invention in which a noise cancelling circuit is combined with the circuit shown in FIG. 3 so as to further improve the noise suppression performance.

Referring to FIG. 4, the noise cancelling circuit comprises a pair of noise detecting transistors 29 and 30, and a constant current circuit including a transistor 31. The cathode voltage of the diode 6 is equal to that of the diode 7, and the base voltage of the transistor 29 is lower than that of the transistor 30 by an amount corresponding to the voltage drop across a resistor 32.

Figure 5:
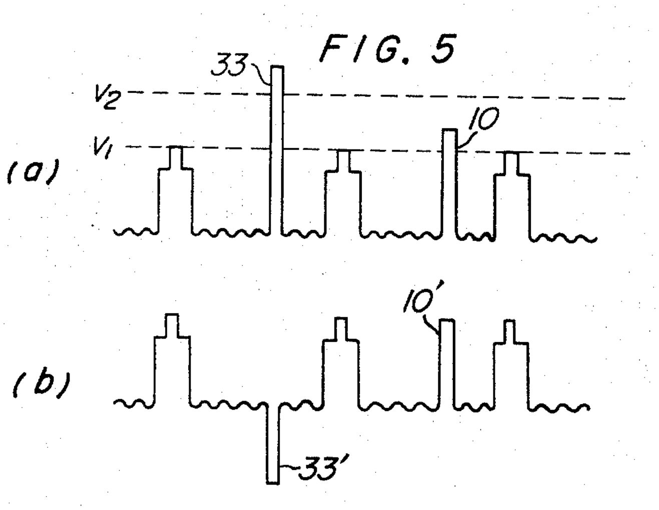
FIG. 5,*a* and *b* are signal waveforms appearing at the input and output of the circuit shown in FIG. 4.

Suppose now that a noise pulse 33, whose level is higher than the voltage $V_2$ which is the sum of the peak value $V_1$ of the synchronizing signal and the voltage drop across the resistor 32 as shown in FIG. 5a, is applied to the input terminal 1. In this case, the base voltage of the transistor 30 remains substantially constant due to the fact that the capacitors 8 and 12 are disposed on the side of the base of the transistor 30, but the base voltage of the transistor 29 increases to a level higher than the base voltage of the transistor 30 as a result of the application of such a noise 33. The transistor 29 conducts and a negative pulse 33' as shown in FIG. 5*b* appears at the collector of the transistor 29, hence the terminal 9. Thus, the noise 33 is inverted or cancelled.

It will be seen that, when an input signal containing noise 33 as shown in FIG. 5a is applied to the input terminal 1, this noise 33 is limited by the diode 6 and is then inverted by the transistor 29 so that a signal waveform as shown in FIG. 5*b* can be finally derived from the terminal 9. The noise suppression circuit is essentially required beside the noise cancelling circuit for the following reasons: In the commercial production of the noise cancelling circuit of the kind above described, it is difficult to design the circuit so that it can cancel all the noises whose levels are higher than the peak level of the synchronizing signal due to the fact that the resistance of the resistor 32 therein is not always the same. Therefore, the noise cancelling circuit is generally designed so as to invert solely such noises whose levels are considerably higher than the peak level of the synchronizing signal, for example, those noises whose levels are higher than the voltage $V_2$. This manner of design results in the disadvantage that the synchronizing separator circuit, AGC circuit and other circuits in the succeeding stages are adversely affected by noises whose levels lie between $V_1$ and $V_2$. The noise suppression circuit is essentially required to obviate the disadvantage above described. The noise suppression circuit according to the present invention can be designed so that the base-emitter voltage of the transistor 2 is equal to the cathode-anode voltage of the diode 6, thereby reliably suppressing any noises whose level are higher than the peak level of the synchronizing signal.

A circuit consisting of resistors 34, 35 and diodes 36, 37 is provided so that the AGC circuit loop may not be kept cut-off by the noise cancelling circuit including the transistors 29 and 30. When the transistor 29 is continuously conducting due to the application of a series of continuous noises to the input terminal 1, the capacitors 8 and 12 are not charged due to the fact that the diode 6 is cut off. The charges stored in the capacitors 8 and 12 are discharged through the transistor 17 and the base voltage of the transistor 30 is gradually lowered until finally the base voltage is lower than such base voltage of the transistor 29 which appears in the absence of any noises. As a result, the transistor 29 conducts although no noises are contained in the input signal, and the AGC circuit loop is kept in the cut-off state. Since no signal is transmitted to the AGC circuit, it acts to increase the gain of the high-frequency and intermediate frequency amplifiers, and the level of the signal applied to the input terminal 1 is increased until finally the amplifiers in the preceding stages are saturated and the DC level of the signal applied to the input terminal 1 is thereby increased. The provision of the circuit consisting of the resistors 34, 35 and diodes 36, 37 is effective in eliminating the above trouble. When the signal including such a high DC level is applied to the input terminal 1, the anode voltage of the diode 36 in the additional circuit consisting of the resistors 34, 35 and diodes 36, 37 is increased thereby charging the capacitors 8 and 12 through the diode 37 and resistor 35. The base voltage of the transistor 30 is increased to a level higher than that of the transistor 29 and the transistor 29 is cut off. The transistor 29 is normally cut off in the absence of any noises. On the other hand, when a noise is applied to the input terminal 1 in the normal operating condition of the circuit, the capacitors 12 and 8 are only slightly charged by the voltage applied from the diode 37 due to the presence of the resistor 35, and the voltage across the capacitors 8 and 12 is not substantially affected by the noise. The noise is satisfactorily cancelled by the transistor 29.

What is claimed is:

1. A noise suppression circuit comprising:

a transistor, the collector thereof being connected to a power supply;

a diode and an impedance means capable of passing direct current connected in series between the emitter and the collector of said transistor;

a constant current circuit connected between the emitter of said transistor and ground for maintaining constant the sum of the emitter current of said transistor and the current flowing through said diode;

a DC restorer connected between the connecting point of said impedance means and said diode and ground;

means for supplying an input signal to the base of said transistor; and means for generating an output signal across said impedance means.

2. A noise suppression circuit as claimed in claim 1, wherein said impedance means comprises a resistor.

3. A noise suppression circuit as claimed in claim 1, wherein said impedance means comprises a resistor, and said DC restorer comprises a second diode, a second constant current circuit connected in series with said second diode, and a capacitor connected in parallel with said second constant current circuit.

4. A noise suppression circuit comprising:

a transistor, the collector thereof being connected to a power supply;

a first diode and a resistor connected in series between the emitter of said transistor and said power supply;

a first constant current circuit connected between the emitter of said transistor and ground for maintaining constant the sum of the emitter current of said transistor and the current flowing through said first diode;

a second diode and a second constant current circuit connected in series between the connecting point of said resistor and said first diode and ground;

a capacitor connected in parallel with said second constant current circuit for being charged with current flowing through said second diode and discharging through said second constant current circuit;

means for supplying an input signal to the base of said transistor; and means for generating an output signal in which noise is suppressed across said resistor.

5. A noise suppression circuit as claimed in claim 4, wherein said first and second constant current circuits comprise a second transistor and a third transistor respectively which are connected at the bases thereof to said power supply to be supplied with a constant base bias voltage.

6. A noise suppression circuit comprising:

a first transistor, the collector thereof being connected to a power supply;

a first diode and a resistor connected in series between the emitter of said first transistor and said power supply;

a first constant current circuit connected between the emitter of said first transistor and ground for maintaining constant the sum of the emitter current of said first transistor and the current flowing through said first diode;

a second diode and a second constant current circuit connected in series between the connecting point of said resistor and said first diode and ground;

a capacitor connected in parallel with said second constant current circuit for being charged with current flowing through said second diode and discharging through said second constant current circuit;

means for supplying an input signal to the base of said first transistor;

a pair of a second and a third transistor, the emitters of said second and third transistors of said pair being connected through a third constant current circuit to ground, the base of said second transistor of said pair being connected to the emitter of said first transistor to be supplied with said input signal, the base of said third transistor of said pair being connected to the connecting point of said second diode and said capacitor to be supplied with a DC voltage whose value is proportional to the peak value of said input signal, and one of the collectors of said second and third transistors of said pair being connected to the connecting point of said resistor and said first-mentioned diode so that an inverted pulse appears at said collector when a noise whose amplitude is greater than a predetermined value is contained in said input signal; and means for generating an output signal in which the noise is suppressed or cancelled at the connecting point of said resistor and said first diode.

7. A noise suppression circuit comprising:

a first transistor, the collector thereof being connected to a power supply;

a first diode and a first resistor connected in series between the emitter of said first transistor and said power supply;

a first constant current circuit connected between the emitter of said first transistor and ground for maintaining constant the sum of the emitter current of said first transistor and the current flowing through said first diode;

a second diode and a second constant current circuit connected in series between the connecting point of said first resistor and said first diode and ground;

a capacitor connected in parallel with said second constant current circuit for being charged with current flowing through said second diode and discharging through said second constant current circuit;

means for supplying an input signal to the base of said first transistor;

a pair of second and a third transistor, the emitters of said second and third transistors of said pair being connected through a third constant current circuit to ground, the base of said second transistor of said pair being connected to the emitter of said first transistor to be supplied with said input signal, the base of said third transistor of said pair being connected to the connecting point of said second diode and said capacitor to be supplied with a DC voltage whose value is proportional to the peak value of said input signal, and one of the collectors of said second and third transistors of said pair being connected to the connecting point of said first resistor and said first diode so that an noise cancelling pulse thereto inverted pulse appears at said collector when noise whose amplitude is greater than predetermined value is contained in said input signal;

a second resistor and a third diode connected in series between the emitter and the collector of said first transistor;

a fourth diode and a third resistor connected in series between the connecting point of said second resistor and said third diode and the connecting point of said second diode and said second constant current circuit for supplying a charging current through said second resistor and said fourth diode to said capacitor when noise whose amplitude is greater than a predetermined value is contained in said input signal; and means for generating an output signal in which the noise is suppressed or cancelled at the connecting point of said first resistor and said first diode.

8. A noise suppression circuit as claimed in claim 7, wherein each of said first, second and third constant current circuits comprises a transistor whose base is connected to said power supply for supplying constant current therethrough.

* * * * *